United States Patent
Inage et al.

(10) Patent No.: US 7,594,387 B2
(45) Date of Patent: Sep. 29, 2009

(54) MODIFIED FUEL BURNING GAS TURBINE

(75) Inventors: Shinichi Inage, Hitachi (JP); Nobuyuki Hokari, Hitachinaka (JP); Osami Yokota, Hitachinaka (JP); Hirokazu Takahashi, Hitachinaka (JP); Masahiko Yamagishi, Hitachinaka (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 485 days.

(21) Appl. No.: 11/178,489

(22) Filed: Jul. 12, 2005

(65) Prior Publication Data
US 2006/0288705 A1 Dec. 28, 2006

(30) Foreign Application Priority Data
Jul. 15, 2004 (JP) ............................. 2004-208474

(51) Int. Cl.
*F02C 3/30* (2006.01)
(52) U.S. Cl. .................................. 60/39.464; 60/39.59
(58) Field of Classification Search .............. 60/39.461, 60/39.465, 39.53, 39.59, 39.464; 44/301
See application file for complete search history.

(56) References Cited

U.S. PATENT DOCUMENTS 6,663,680 B1 * 12/2003 Dodd et al. .................... 44/301

6,852,215 B2 * 2/2005 Wen et al. .................... 208/209

FOREIGN PATENT DOCUMENTS

| JP | 2000-109850 | 4/2000 |
|----|-------------|--------|
| JP | 2002-338973 | 11/2002 |
| JP | 2003-286865 | 10/2003 |

* cited by examiner

*Primary Examiner*—Louis J Casaregola
(74) *Attorney, Agent, or Firm*—Mattingly & Malur, P.C.

(57) ABSTRACT

A gas turbine which can be easily employed in an area where it is hard to obtain a sufficient amount of water, such as an isolated island. Heated and pressurized heavy oil and water in a supercritical state are mixed with each other in a modifying unit to produce fuel-purpose modified oil. The fuel-purpose modified oil is depressurized by a depressurizing valve. Due to a temperature fall caused by adiabatic expansion with the depressurization, the fuel-purpose modified oil is brought into a two-phase state where moisture is in a gas phase (steam) and modified oil is in a liquid phase. The fuel-purpose modified oil is separated into the steam and the modified oil by a gas-liquid separator. The separated steam is condensed to water in a condenser and returned to a water supply line. The modified oil in the liquid phase is supplied to a combustor, thereby driving a gas turbine.

4 Claims, 3 Drawing Sheets

MODIFIED FUEL BURNING GAS TURBINE

BACKGROUND OF THE INVENTION

1. Field of the Invention

The present invention relates to a modified fuel burning gas turbine, which is operated using, as fuel, modified oil prepared by heating and pressurizing heavy oil and mixing the heavy oil with high-temperature, high-pressure water for property modification and lightening of the oil. The present invention also relates to a method of operating the gas turbine.

2. Description of the Related Art

A combined gas turbine is well known which is operated using, as fuel, modified oil prepared by heating and pressurizing heavy oil and mixing the heavy oil with supercritical water for property modification and lightening of the oil. Such a technique is disclosed, for example, in Patent Reference 1 (JP,A 2000-109850).

With the disclosed technique, the heavy oil is pressurized to about 20 MPa by a pressurizing pump, and is heated to about 350° C. by heat exchange that is performed with exhaust gases at about 550° C. in a heat transfer pipe installed in an exhaust heat recovering boiler.

Similarly, supply water is pressurized to about 20 MPa by a pressurizing pump, and is heated to about 450° C. by heat exchange that is performed with the exhaust gases at about 550° C. in a heat transfer pipe installed in the exhaust heat recovering boiler.

The heated and pressurized heavy oil and the water in a supercritical state are mixed with each other in a modifying unit to produce fuel-purpose modified oil. The fuel-purpose modified oil is depressurized through a depressurizing valve and supplied to a combustor, thereby driving a gas turbine. Further, steam produced in the exhaust heat recovering boiler drives a steam turbine.

SUMMARY OF THE INVENTION

In the gas turbine burning modified fuel that is prepared by modifying heavy oil, high-temperature and high-pressure water is required to mix with the heavy oil for property modification. With the known technique, steam contained in the fuel-purpose modified oil is also supplied, as it is, to the combustor.

The known technique is effective in, with addition of steam, lowing the flame temperature in the combustor and reducing nitrogen oxides generated in the combustor. On the other hand, a large amount of water is required and a difficulty occurs in practical use of the gas turbine in an area where it is hard to obtain a sufficient amount of water, such as an isolated island.

Accordingly, an object of the present invention is to reuse water that has been employed for modifying heavy oil, and to greatly reduce the amount of water used.

To achieve the above object, the present invention provides a modified fuel burning gas turbine comprising a depressurizing device disposed between a modifying unit and a combustor, a separator for separation of depressurized the fuel-purpose modified oil into liquid-phase modified oil and steam, a gas turbine operated with the liquid-phase modified oil supplied to the combustor, a condenser for condensing the separated steam to water, and a resupplier for resupplying the condensed water to said modifying unit.

With that feature, it is possible to reuse water that has been employed for modifying heavy oil, and to greatly reduce the amount of water used.

DESCRIPTION OF THE PREFERRED EMBODIMENTS

Figure 1:
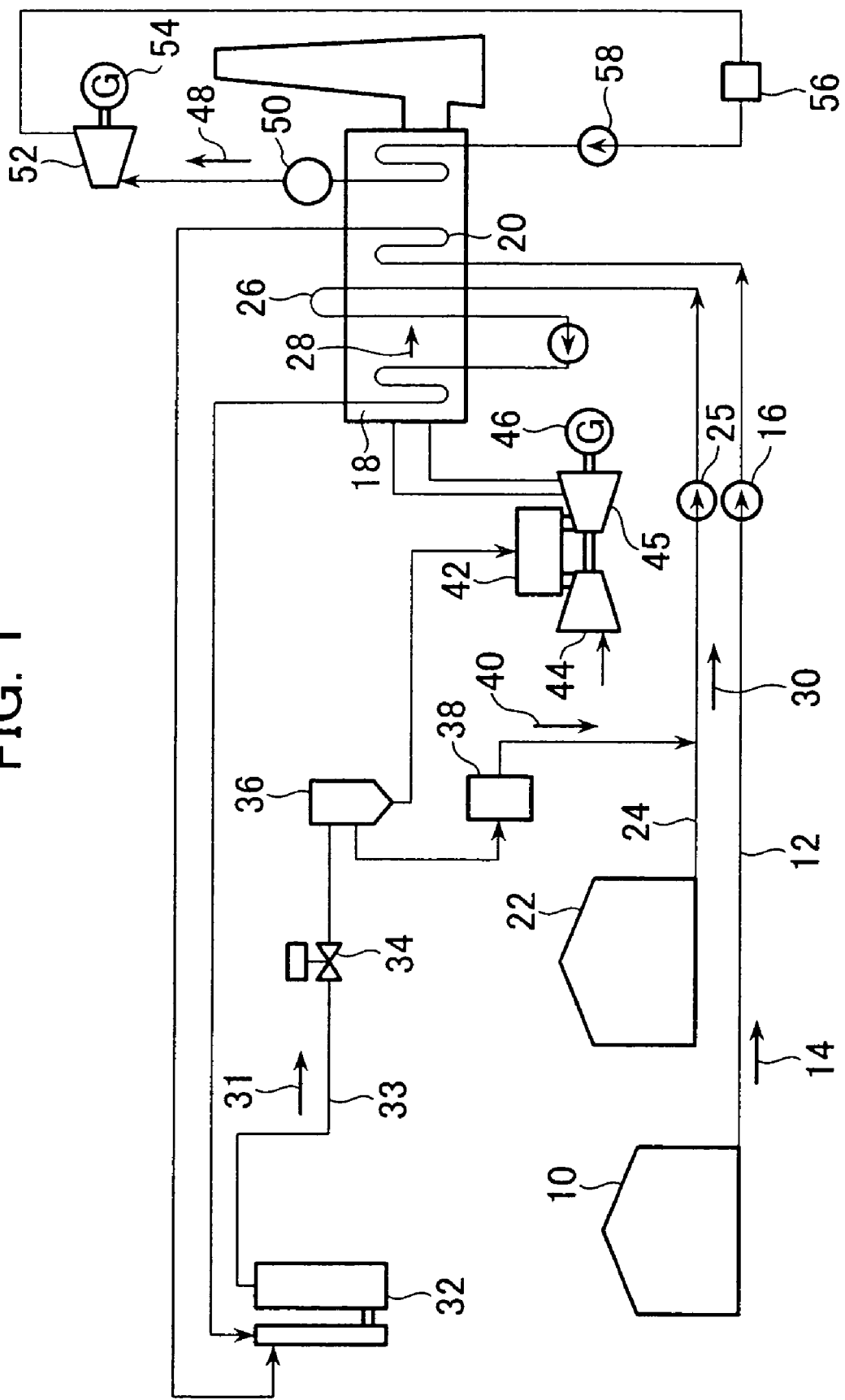
FIG. 1 is a block diagram of a gas turbine according to a first embodiment of the present invention, which is operated using fuel prepared by modifying heavy oil.

The present invention will be described in detail below in connection with embodiments illustrated in the drawings.

Referring to FIG. 1, heavy oil 14 supplied from a heavy oil tank 10 through a heavy oil supply line 12 is pressurized to about 20 MPa by a pressurizing pump 16. The pressurized heavy oil 14 is heated to about 350° C. by heat exchange that is performed with exhaust gases 28 at about 550° C. in a heat transfer pipe 20 installed for the heat exchange in an exhaust heat recovering boiler 18.

Similarly, water 30 supplied from a water tank 22 through a water supply line 24 is pressurized to about 20 MPa by a pressurizing pump 25. The pressurized water 30 is heated to about 450° C. by heat exchange that is performed with the exhaust gases 28 at about 550° C. in a heat transfer pipe 26 installed in the exhaust heat recovering boiler 18.

The heated and pressurized heavy oil 14 and the water 30 in a supercritical state are mixed with each other in a modifying unit 32 to produce fuel-purpose modified oil 31. The fuel-purpose modified oil 31 is supplied to a depressurizing valve 34 through a fuel-purpose modified oil supply line 33 and is depressurized by the depressurizing valve 34. Due to a temperature fall caused by adiabatic expansion with the depressurization, the fuel-purpose modified oil 31 is brought into a two-phase state where moisture is in a gas phase (steam) and modified oil is in a liquid phase.

The fuel-purpose modified oil 31 in the two-phase state is separated into the steam and the liquid-phase modified oil by a gas-liquid separator 36. The steam is condensed to water 40 in a condenser 38, and the water 40 is returned to the water supply line 24. The liquid-phase modified oil is supplied to a combustor 42, thereby driving gas turbines 44, 45. The gas turbines 44, 45 drive a generator 46.

Furthermore, steam 48 produced in the exhaust heat recovering boiler 18 is introduced to a steam turbine 52 through a drum 50 of the exhaust heat recovering boiler 18. The steam turbine 52 drives a generator 54. The steam having driven the steam turbine 52 is condensed to water in a condenser 56 and is supplied to the exhaust heat recovering boiler 18 through a circulating pump 58.

According to this first embodiment, since the steam used for modifying the heavy oil is reused, a gas turbine burning the modified oil can be applied to an area where it is hard to obtain a sufficient amount of water, such as an isolated island.

Figure 2:
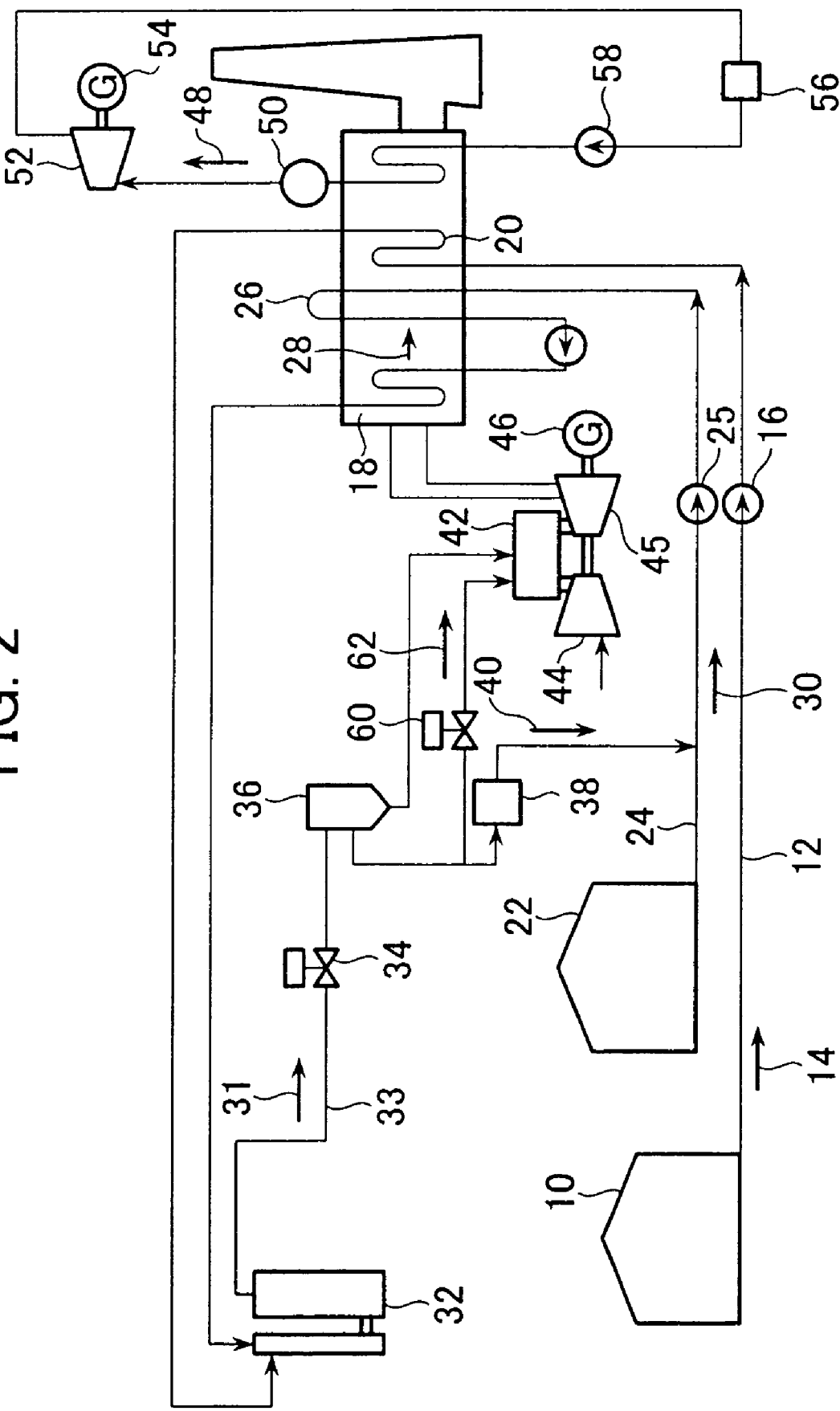
FIG. 2 is a block diagram of a gas turbine according to a second embodiment of the present invention, which is operated using fuel prepared by modifying heavy oil.

FIG. 2 is a block diagram of a gas turbine according to a second embodiment of the present invention.

Heavy oil 14 supplied from a heavy oil tank 10 through a heavy oil supply line 12 is pressurized to about 20 MPa by a pressurizing pump 16. The pressurized heavy oil 14 is heated to about 350° C. by heat exchange that is performed with exhaust gases 28 at about 550° C. in a heat transfer pipe 20 installed for the heat exchange in an exhaust heat recovering boiler 18.

Similarly, water 30 supplied from a water tank 22 through a water supply line 24 is pressurized to about 20 MPa by a pressurizing pump 25. The pressurized water 30 is heated to about 450° C. by heat exchange that is performed with the exhaust gases 28 at about 550° C. in a heat transfer pipe 26 installed in the exhaust heat recovering boiler 18.

The heated and pressurized heavy oil 14 and the water 30 in the supercritical state are mixed with each other in a modifying unit 32 to produce fuel-purpose modified oil 31. The fuel-purpose modified oil 31 is supplied to a depressurizing valve 34 through a fuel-purpose modified oil supply line 33 and is depressurized by the depressurizing valve 34. Due to a temperature fall caused by adiabatic expansion with the depressurization, the fuel-purpose modified oil 31 is brought into a two-phase state where moisture is in a gas phase (steam) and modified oil is in a liquid phase. Thereafter, the fuel-purpose modified oil 31 is separated into the steam and the liquid-phase modified oil by a gas-liquid separator 36.

In this second embodiment, the steam is divided by a steam distributor 60 in the form of a valve for supply to both a line communicating with a condenser 38 and a line communicating with a combustor 42 in a distributive way. The steam supplied to the line communicating with the condenser 38 is condensed to water 40 in the condenser 38 and is returned to the water supply line 24.

Steam 62 supplied to the line communicating with the combustor 42 and the liquid-phase modified oil are supplied to the combustor 42, thereby driving gas turbines 44, 45. Further, steam 48 produced in the exhaust heat recovering boiler 18 drives a steam turbine 52 through a drum 50 of the exhaust heat recovering boiler 18. The steam turbine 52 drives a generator 54. The steam having driven the steam turbine 52 is returned to the exhaust heat recovering boiler 18 through a condenser 56 and a circulating pump 58.

According to this second embodiment, the flame temperature can be reduced with the steam supplied to the combustor 42 while the amount of water used for modifying the heavy oil is reduced. Therefore, the generation of nitrogen oxides can be suppressed.

Stated another way, the steam generated with the depressurization is divided into two lines. The steam in one line is supplied to the condenser 38 and the condensed water is resupplied to the modifying unit 32, whereas the steam in the other line is directly supplied to the combustor 42. As a result, it is possible to not only suppress the generation of nitrogen oxides by injecting steam to the combustor as with the advantage of the known technique, but also to greatly reduce the amount of water used in comparison with the known technique by reusing the water used for modifying heavy oil.

Figure 3:
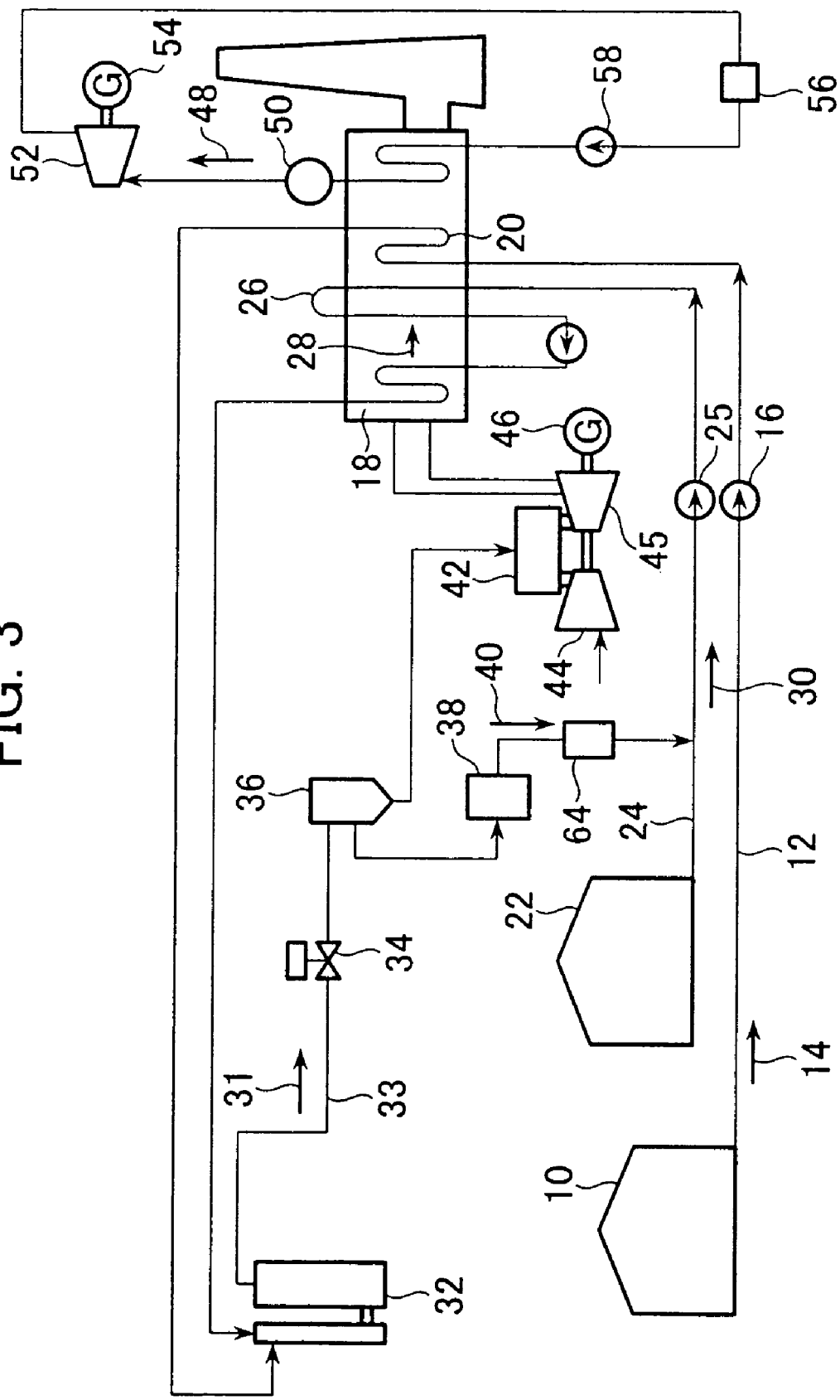
FIG. 3 is a block diagram of a gas turbine according to a third embodiment of the present invention, which is operated using fuel prepared by modifying heavy oil.

FIG. 3 is a block diagram of a gas turbine according to a third embodiment of the present invention.

Heavy oil 14 supplied from a heavy oil tank 10 through a heavy oil supply line 12 is pressurized to about 20 MPa by a heavy oil pressurizing pump 16. The pressurized heavy oil 14 is heated to about 350° C. by heat exchange that is performed with exhaust gases 28 at about 550° C. in a heat transfer pipe 20 installed for the heat exchange in an exhaust heat recovering boiler 18.

Similarly, water 30 supplied from a water tank 22 through a water supply line 24 is pressurized to about 20 MPa by a water pressurizing pump 25. The pressurized water 30 is heated to about 450° C. by heat exchange that is performed with the exhaust gases 28 at about 550° C. in a heat transfer pipe 26 installed for the heat exchange in the exhaust heat recovering boiler 18.

The heated and pressurized heavy oil 14 and the water 30 in the supercritical state are mixed with each other in a modifying unit 32 to produce fuel-purpose modified oil 31. The fuel-purpose modified oil 31 is supplied to a depressurizing valve 34 through a fuel-purpose modified oil supply line 33 and is depressurized by the depressurizing valve 34. Due to a temperature fall caused by adiabatic expansion with the depressurization, the fuel-purpose modified oil 31 is brought into a two-phase state where moisture is in a gas phase (steam) and modified oil is in a liquid phase.

Thereafter, the fuel-purpose modified oil 31 in the two-phase state is separated into the steam and the liquid-phase modified oil by a gas-liquid separator 36. The separated steam is condensed to water 40 in a condenser 38.

The water 40 is introduced to a water treatment unit 64 for removal of impurities, and then returned to the water supply line 24. The liquid-phase modified oil is supplied to a combustor 42, thereby driving gas turbines 44, 45.

Furthermore, steam 48 produced in the exhaust heat recovering boiler 18 drives a steam turbine 52. The steam having driven the steam turbine 52 is returned to the exhaust heat recovering boiler 18 through a condenser 56 and a circulating pump 58.

According to this third embodiment, since the water treatment unit 64 removes impurities from the reused water, the impurities can be prevented from affecting the properties of the modified oil. It is therefore possible to remove impurities that have been mixed in the water during the process until the separation after the modification and depressurization, and to reduce influences of the impurities upon the properties of the modified oil.

What is claimed is:

1. A modified fuel burning gas turbine comprising:
   a system for pressurizing heavy oil by a pressurizing pump and heating the pressurized heavy oil in an exhaust heat recovering boiler, thereby obtaining high-temperature, high-pressure heavy oil;
   a system for pressurizing water by a pressurizing pump and heating the pressurized water in said exhaust heat recovering boiler, thereby obtaining high-temperature, high-pressure water;
   a modifying unit for mixing the high-temperature, high-pressure heavy oil with the high-temperature, high-pressure water to produce fuel-purpose modified oil modified in property and lightened;
   a depressurizing device disposed between said modifying unit and a combustor;
   a separator for separation of depressurized the fuel-purpose modified oil into liquid-phase modified oil and steam;
   a gas turbine operated with the liquid-phase modified oil supplied to said combustor and discharging exhaust gases into said exhaust heat recovering boiler;
   a condenser for condensing the steam separated by said separator to water; and
   a resupplier for resupplying the condensed water to said modifying unit.

2. The modified fuel burning gas turbine according to claim 1, wherein a water treatment unit for removing impurities from the condensed water is disposed between said condenser for condensing the steam separated by said separator to water and said resupplier for resupplying the condensed water to said modifying unit.

3. The modified fuel burning gas turbine according to claim 1, wherein the steam generated with depressurization of the fuel-purpose modified oil is divided into two lines, the steam in one line being condensed to water in said condenser and resupplied to said modifying unit through said resupplier, the steam in the other line being directly supplied to said combustor.

4. The modified fuel burning gas turbine according to claim 1, wherein a water treatment unit for removing impurities from the condensed water is disposed between said condenser for condensing the steam to water and said resupplier for resupplying the condensed water to said modifying unit, and the steam generated with depressurization of the fuel-purpose modified oil is divided into two lines, the steam in one line being condensed to water in said condenser and resupplied to said modifying unit through said resupplier, the steam in the other line being directly supplied to said combustor.

* * * * *

UNITED STATES PATENT AND TRADEMARK OFFICE
CERTIFICATE OF CORRECTION

PATENT NO.         : 7,594,387 B2
APPLICATION NO.    : 11/178489
DATED              : September 29, 2009
INVENTOR(S)        : S. Inage et al.

Page 1 of 1

It is certified that error appears in the above-identified patent and that said Letters Patent is hereby corrected as shown below:

ON THE TITLE PAGE

Please correct (75) Inventors: to read as follows:

(75) Inventors:  ~~Shinichi~~ Shin-Ichi Inage, Hitachi (JP); Nobuyuki Hokari, Hitachinaka (JP); Osami Yokota, Hitachinaka (JP); Hirokazu Takahashi, Hitachinaka (JP); Masahiko Yamagishi, Hitachinaka (JP)

Signed and Sealed this

Seventeenth Day of November, 2009

David J. Kappos
*Director of the United States Patent and Trademark Office*